United States Patent [19]

Cantoni et al.

[11] Patent Number: 4,870,654

[45] Date of Patent: Sep. 26, 1989

[54] GENERATION OF MULTIPLY FOLDED OPTICAL PATHS

[75] Inventors: Armando Cantoni; Gary M. Woker, both of Escondido, Calif.

[73] Assignee: California Laboratories, Inc., Carlsbad, Calif.

[21] Appl. No.: 258,793

[22] Filed: Oct. 17, 1988

Related U.S. Application Data

[63] Continuation-in-part of Ser. No. 52,977, May 22, 1987, Pat. No. 4,815,094.

[51] Int. Cl.⁴ .............................................. H01S 3/081

[52] U.S. Cl. ........................................ 372/93; 372/64; 372/66; 372/92; 372/94; 372/107; 372/108

[58] Field of Search ..................... 372/93, 94, 92, 107, 372/108, 55, 64, 66, 99, 34, 35, 51

[56] References Cited

U.S. PATENT DOCUMENTS

| | | | |
|---|---|---|---|
| 3,248,671 | 4/1966 | Dill et al. | 372/93 |
| 3,361,987 | 1/1968 | DeMaria | 372/94 |
| 4,169,251 | 9/1979 | Laakmann | 372/64 |
| 4,429,398 | 1/1984 | Chenausky et al. | 372/64 |
| 4,438,514 | 3/1984 | Chenausky et al. | 372/64 |
| 4,493,087 | 1/1985 | Laakman et al. | 372/64 |

FOREIGN PATENT DOCUMENTS 2033648 10/1979 United Kingdom .

*Primary Examiner*—William L. Sikes

*Assistant Examiner*—Georgia Y. Epps

*Attorney, Agent, or Firm*—Arnold S. Weintraub; Gerald R. Black

[57] ABSTRACT

This new technique for stacking multiply folded optical paths in an extended region of a laser resonator within a gaseous medium. The path segments are connected together by a set of mirrors located along the resonator perimeter. Moreover, this invention involves a system of stacking unit tiles, each minim containing a multiply folded path, into larger domains. A multiplicity of mirrors is located in the laser resonator around the perimeter of stacked minims. A longer optical path is achieved without a corresponding increase in the number of folding elements, by stacking the minims together and thereby extending the length of the folding elements. The resulting domains fully cover the plane with a grid of evenly spaced and intersecting optical paths. The laser resonator can be used in either a laser oscillator or amplifier, and in either pulsed or continuous wave mode. In one embodiment of this invention, a waveguide gas laser system has ceramic blocks located within the laser resonator, and each block has a multiply folded waveguide channel formed therein. The larger multiply folded optical path is formed by stacking the ceramic blocks together and aligning the waveguide channels. The reflecting mirrors of the laser resonator may be integrally attached to the ceramic block, enhancing the durability of the laser resonator and reducing its size.

20 Claims, 6 Drawing Sheets

GENERATION OF MULTIPLY FOLDED OPTICAL PATHS

CROSS-REFERENCE TO RELATED APPLICATIONS

This is a continuation-in-part application to U.S. patent application Ser. No. 052,977 U.S. Pat. No. 4,815,094, entitled "Multiply Folded Laser Systems" by Armando Cantoni, filed on May 22, 1987.

TECHNICAL FIELD

This invention relates to laser resonators and gas laser systems in which the multiply folded optical path is lengthened by the stacking of smaller, multiply folded optical paths.

BACKGROUND ART

Gas lasers offer limited power output capabilities per unit length. The upper limit for a sealed, waveguide $Co_2$ laser is about 0.6 watts/cm: therefore, a 30 watt $CO_2$ laser has a resonator length of about 50 cm. The resulting system architectures are mechanically complex, are not rugged or reliable, and have restricted portability. When waveguide lasers are used with a ceramic bore material, long resonator lengths imply considerable manufacturing difficulties because of tight machine tolerances, poor yields, and high production costs.

Chenausky et al, in U.S. Pat. Nos. 4,429,398 and 4,438,514, addresses the length problem by using mirrors to fold the optical path, achieving some reduction in overall resonator length at the expense of a modest increase in width. In the '398 patent two parallel waveguides are optically coupled by a pair of folding mirrors within a common block. This configuration results in a finite amount of diffraction losses that can be reduced but not eliminated by minimizing the distance traveled in free space. The '514 patent shows a progressive improvement which uses a third diagonal waveguide that connects, end-to-opposite-end, the two parallel waveguides. Since the waveguides are serially connected, the laser cavity will have a series of parallel waveguides, or a Z-folded waveguide arrangement.

De Maria, in U.S. Pat. No. 3,361,987, increases active gain length in a polysided folded laser path in resonators employing solid or liquid amplifier media, with a continuous folded optical path, using total internal reflection. Nakagome et al in U.K. Application No. 2,033,648A employs a similar configuration for achieving long optical paths in semiconductor light amplifiers. The use of total internal reflection by De Maria and Nakagome requires that the refractive indices of the laser medium and the matching medium be selected to achieve the proper angle of reflection. The matching medium may surround the laser medium, or may be deposited on the end faces of the solid medium. De Maria suggest the use of a ruby laser element immersed in liquid oxygen. The required index matching significantly increases the difficulty of manufacturing and operating the laser. In gas lasers with the index of refraction differing from unity by a few parts per million, total internal reflection cannot be used as an optical path folding technique.

Patent Application No. 052,977 U.S. Pat. No. 4,815,094, entitled 'MULTIPLY FOLDED LASER SYSTEMS' by Armando Cantoni, was filed in the U.S. Patent Office on May 22, 1987. This invention discloses a laser resonator having multiply folded optical paths in a region by employing a series of front surface reflecting elements. In these novel and unique configurations, a dramatic reduction in the size of the laser resonators is achieved by multiply folding the optical paths. The Cantoni application is incorporated herein by reference.

Successful implementation of laser-based systems can greatly benefit from a more compact design of the laser resonator. In particular, the length of the optical laser cavity appears to be the limiting parameter. Virtually all applications that require protability and ruggedness are enhanced by a reduction in overall resonator size.

SUMMARY OF THE INVENTION

It is the primary object of this invention to increase the length of the optical path without a corresponding increase in the size of the laser resonator, by fully covering a plane of optical path segments which are connected by front surface reflecting elements. Moreover, longer optical paths can be generated simply by stacking smaller elements, which already contain a number of path segments, into larger elements that fully cover the enlarged plane with a grid of optical path segments.

It is another object of this invention to stack small multiply folded optical paths into a larger multiply folded optical path, thereby producing a more space-efficient design and simplifying the alignment for the larger optical path.

Still another object of this invention is to simplify the design of a waveguide laser resonator, by stacking a plurality of solid blocks which contain the waveguide channels.

These objects are met by stacking multiply folded optical paths in an extended region of a laser resonator within a gaseous medium, whereby path segments are connected and aligned together along the resonator perimeter.

Moreover, this invention involves a system of stacking minims (unit tiles), each minim containing a multiply folded path, into larger domains. A multiplicity of mirrors can be located in the laser resonator around the perimeter of the stacked minims. A long optical path is achieved without a corresponding increase in the number of folding elements, by stacking the minims together and extending the length of the folding elements. The resulting domains fully cover the plane with a planar grid of evenly spaced and intersecting optical paths. In a similar manner, smaller modules can be stacked to form larger domains.

The principles of this invention are preferably incorporated into a waveguide gas laser system having ceramic blocks located within the laser resonator, each block having multiply folded waveguide channels formed therein. The larger multiply folded optical path is formed by stacking the ceramic blocks together and aligning the waveguide channels. The reflecting mirrors of the laser resonator may be integrally attached to the ceramic block, enhancing the durability of the laser and reducing its size. The active resonator can be used for either a laser oscillator or amplifier, and in either pulsed or continuous wave mode.

The novel features which are believed to be characteristic of this invention, which increase the length of the optical path by stacking smaller, multiply folded optical paths together, with further objects and advantages thereof, will be better understood from the following description in connection with the accompanying drawings in which the presently preferred embodiments of the invention are illustrated by way of example. It is expressly understood, however, that the drawings are for purposes of illustration and description only, and are not intended as a definition of the limits of the invention. Throughout the following description and drawings, identical reference numbers refer to the same component through the multiple drawings of the invention.

BRIEF DESCRIPTION OF THE DRAWINGS

FIG. 5D is an "acceptable" stacked, rectangular, open loop configuration obtained by stacking two modules identical to the module depicted in FIG. 5D'.

FIG. 5E is another "acceptable" stacked, rectangular, closed loop configuration obtained by stacking two modules identical to the module depicted in FIG. 5E'.

FIG. 5F is another "acceptable" stacked, rectangular, closed loop geometry obtained by stacking two modules identical to the module depicted in FIG. 5F'.

DETAILED DESCRIPTION OF THE INVENTION

Many portions of this description are depicted in terms of planar geometries for purposes of illustration. However, the teachings of this invention are equally applicable to non-planar configurations.

A plane may be filed in a controlled and uniform manner by using a single polygon form, such as triangles, quadrangles, or hexagons. The hexagons and more complex polygonal configurations are a combination of triangles or quadrangles, and therefore are not discussed herein. Instead, triangles and quadrangles are used as representative elements for purposes of illustration, and the principles of this invention are equally applicable to more complex polygonal configurations.

Figure 1A:
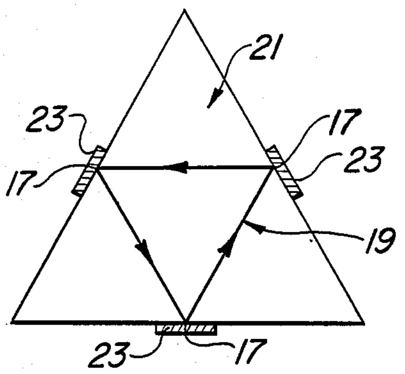
FIG. 1A is a closed loop minim in the shape of a triangle.

FIG. 1A is a plane surface element of least surface area (minim) 21 in the shape of an equilateral triangle. Minim 21 carries optical path 19 through three mirrors 23 with nodes 17 located at the juncture of optical path 19 and mirrors 23. If the spacing between nodes 17 is "a", the overall path length is "3*a*", minim 21 has a perimeter of "6*a*", and the length of each side is "2*a*".

The stacking of triangular minims yields triangular modules. The number of minims in any successive row (N) is a function of the number of rows (R), and can be calculated as follows:

$$N=2R-1$$

Hence, the number of minims in the second row is 3, and the number of minims in the third row is 5. The total number of minims ($N_M$) in a triangular configuration is calculated as follows:

$$N_M=R^2$$

Hence, a three-row configuration will have 9 minims (1+3+5). Similarly, the total number of sides ($N_S$) in the triangular module is:

$$N_S=3R$$

The overall perimeter (P) of a stacked equilateral triangular module is:

$$P=6aR,$$

where $2a$ is one side of the minim. The area (A) of a stacked equilateral triangular module is equal to:

$$A=(3)^{0.5}a^2R/2$$

For all triangular configurations except for a single minim, the number of node reflections ($C_N$) and the number of node crossings ($C_N$) are fixed:

$$R_N=6, \text{ and } C_N=3$$

Figure 2A:
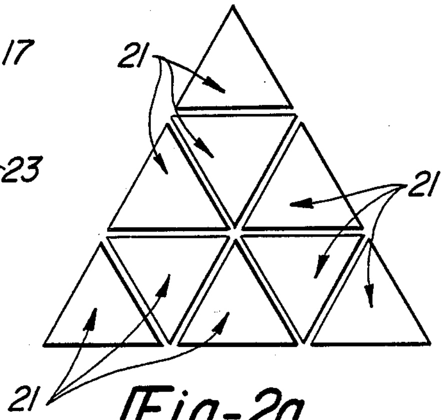
FIG. 2A is a stacked, closed loop triangular configuration.

FIG. 2A shows an equilateral module 27 obtained by stacking nine equilateral minims in three rows. The dashed lines trace the optical path contained in each of the nine minims utilized in the stacking.

Figure 2B:
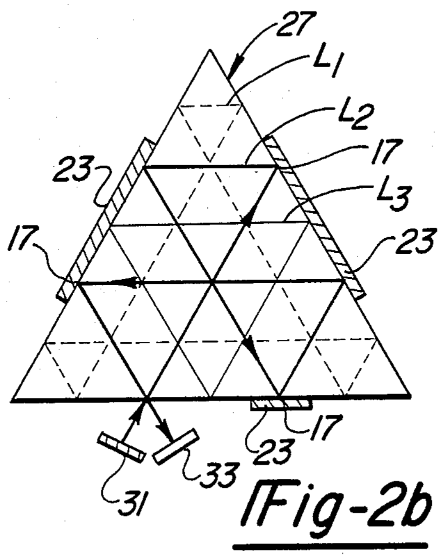
FIG. 2B is the stacked, closed loop triangular configuration of FIG. 2A showing three potential, distinct, multiply folded optical paths.

FIG. 2B depicts the module 27 and three possible closed loop, multiply folded optical paths contained therein. Optical path $L_1$ fully traces the optical paths contained in the corner minims utilized in the stacking, and only partially traces the optical paths contained in the remaining minims. Optical path $L_2$, while still a viable closed loop path, traces none of the original paths contained in the minims utilized in the stacking, but rather follows the sides which are shared by neighboring minims in the stacking. The lengths of optical paths $L_1$ and $L_2$ are identical and equal to the perimeter of the module (18*a*). Optical path $L_3$ partially traces the optical paths of some of the minims used in the stacking, and traces none of the path of the corner minims used in the stacking. Its length is equal to half the perimeter of the module (9*a*). Functionally, optical path $L_3$ is equivalent to a path obtained, not by stacking the nine minims to form the module 27, but by enlarging the minim used in the stacking to a size equal to that of the module 27.

Figure 2C:
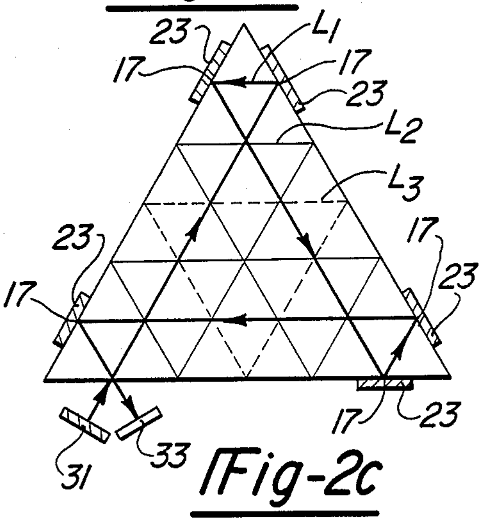
FIG. 2C is the embodiment of a resonator obtained by utilizing one of the multiply folded optical paths in FIG. 2B.

FIG. 2C depicts an optical resonator that can be obtained from module 27 by placing three fold mirrors 23 along the perimeter of the module. Partial reflector 33 and total reflector 31 are located at the same node, to define a closed loop optical path $L_1$, represented by a dashed line. The dotted path $L_3$ represents the total path length contained in the minims utilized in this stacking which is not traced by the optical path $L_1$ and therefore cannot contribute to the resulting optical pathlength.

While it is possible to increase the optical path length in a resonator by stacking a number of triangular minims, the examples above clearly illustrate the intrinsic limitation of this approach. For a given stacking (module size), the total path length in a triangular configuration is fixed and cannot exceed the perimeter of the module. As the module size (number of minims used in the stacking) increases, the ratio of the total path length to the sum of the path length contained in the stacked minims decreases, resulting in an inefficient utilization of the module area. Finally, the resulting optical path, such as $L_1$ in FIG. 2B, may result in non-uniform coverage of the module (since it fully traces the minim path in the three corner minims, and only partially in the remaining minims). This results in non-uniform thermal loading across the module, when the configuration is used as a resonator in active devices such as lasers or amplifiers.

Figure 1C:
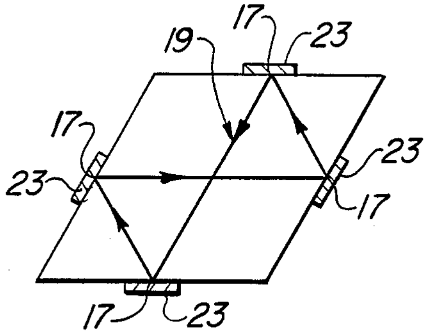
FIG. 1C is a closed loop minim in the shape of a rhombus.
Figure 1B:
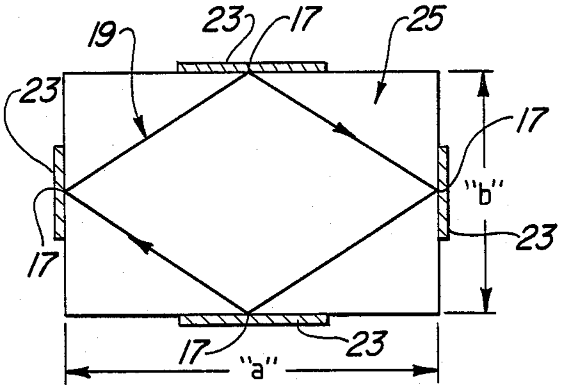
FIG. 1B is a closed loop minim in the shape of a rectangle.

FIG. 1B is a plane minim 25 in the shape of a rectangle. Minim 25 carries optical path 19 through four mirrors 23 again with nodes 17 located at the juncture of optical path 19 and mirrors 23. FIG. 1C depicts a typical rhombic minim 16.

Figure 3A:
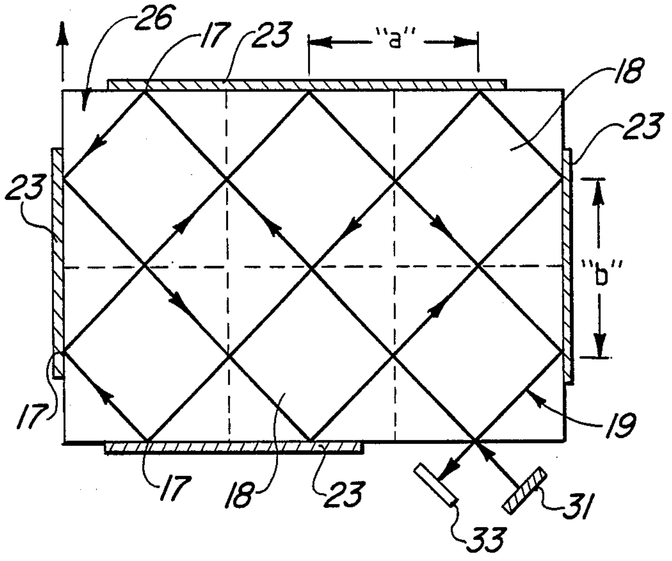
FIG. 3A is a stacked, rectangular, closed loop configuration.

With reference to FIG. 3A, module 26 is obtained by stacking six square minims 29 in three columns of two rows each. Internal reflections 18 are intersections of optical path 19 with itself. The resulting grid of multiply folded optical paths can be uniquely defined by four operational parameters:

- "i" is the number of nodes along one edge of the module (three are shown along the x-axis in FIG. 3A);
- "j" is the number of nodes along the orthogonal edge of the module (two are shown along the y-axis in FIG. 3A);
- "a" is the spacing between nodes along the "i" edge; and
- "b" is the node spacing along the "j" edge.

The resulting module is determined by specifying "i" and "j", and its size can be scaled by a choice of grid parameters "a" and "b." Hence, the configuration in FIG. 3A is designated as M(3,2), where index $i=3$, and index $j=2$.

In a stacked, closed loop configuration such as shown in FIG. 3A, total reflector 31 and partial reflector 33 are located at the same node. In a stacked, closed loop configuration, index "i" and index "j" are each integers (1, 2, 3, 4, 5, . . . ). The most effective stacking is a closed loop, "quasi-square" configuration. The "quasi-square" is a module having indices which differ by plus or minus one, such as M(3,4) or M(5,4), and is preferred from a functional point of view because it maximizes the length of the optical path while minimizing the surface area. When the optical path is folded in a "quasi-square", a given path length has a minimum number of nodes. When used as a laser resonator, module 26 may have any polygonal shape, but use of rectangular folding patterns will permit the closest packing of optical path in a given area. It has been found that the best "quasi-square" arrangement for the fold mirrors is 45° reflections (square minims where $a=b$).

Figure 3B:
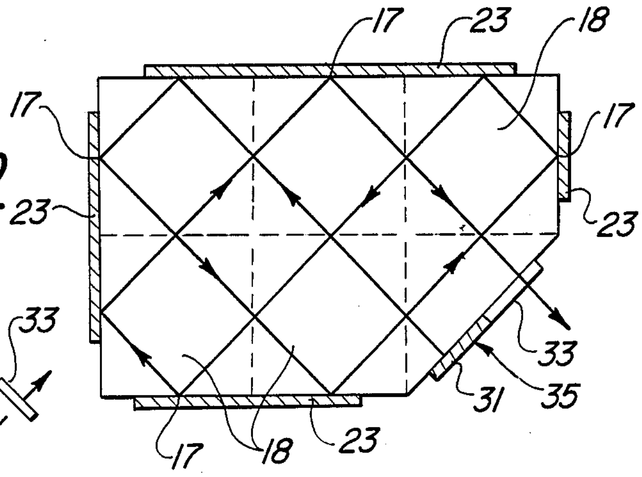
FIG. 3B is another embodiment of a stacked, rectangular, closed loop configuration.

FIG. 3B depicts a preferred embodiment, as one corner has been removed to provide an entrance and an exit for optical path 19. Single optical substrate 35 is inserted in the removed corner, normal to incident segments of optical path 19. Substrate 35 may be "split-coated" to incorporate both total reflector 31 and partial reflector 33, and installed in a single gimbal mount for proper alignment tuning to the waveguide grid. The use of single optical substrate 35 permits lower cost optics, since only one mount is needed. Alignment is easier, since partial reflector 33 and total reflector 31 need not be independently aligned. Waveguide lasers with plano-plano total and partial reflectors are suggested, since flat reflector elements are preferred in this approach.

Figure 4:
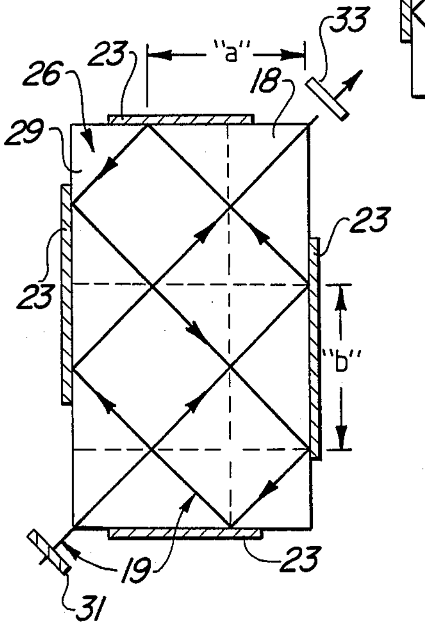
FIG. 4 is a stacked, rectangular, open loop configuration.

An open loop configuration, wherein partial reflector 33 and total reflector 31 are located at different nodes, is depicted in FIG. 4, which is designated as M(1.5,2.5). Here, partial reflector 33 is located in one corner, and total reflector 31 is located in the opposite corner. This preserves an optical axis between the entrance and exit channels, with an offset defined by channel spacing. When the reflectors are located at opposite corners, the "i" index is equal to half integers (½, 3/2, 5/2, 7/2 . . . ) and the "j" index is also equal to half integers. This is the preferred configuration for use as a single pass amplifier, since the output beam is parallel to the input beam. When it is necessary to introduce special optical elements for use in the resonator (such as prisms or gratings for wavelength control, piezoelectric elements for cavity control, or intracavity electro- or acousto-optical elements, or total or partial reflectors with finite radii of curvature), open loop configurations that allow for independent mounting for such elements are preferred.

Figure 5A:
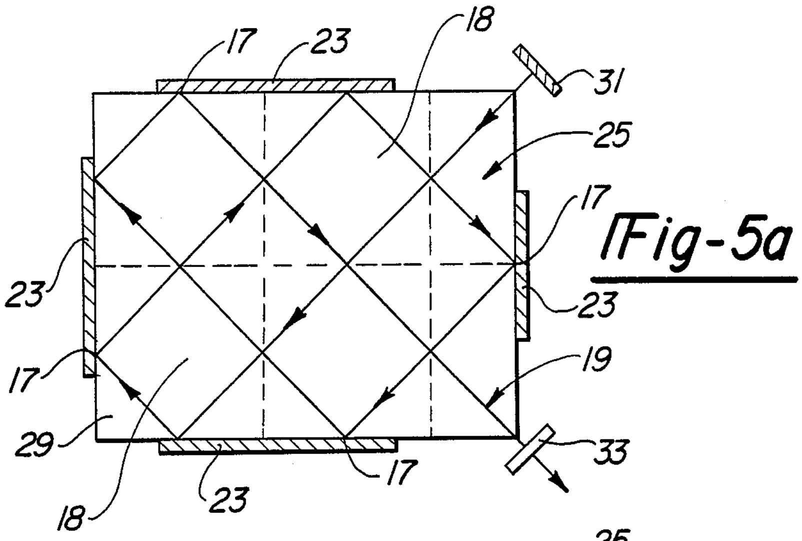
FIG. 5A is another embodiment of a stacked, rectangular, open loop configuration.

Another type of open loop configuration is shown in FIG. 5A, which is designated as M(2.5,2). In the configuration where the reflectors are located at adjacent corners, one index is an integer and the other is a half integer.

Figure 5B:
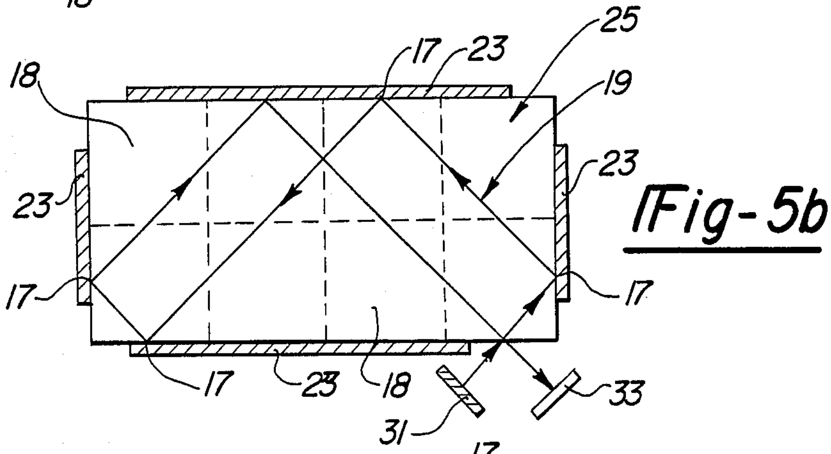
FIG. 5B is a stacked, rectangular, closed loop configuration which yields an "unacceptable" module.
Figure 5C:
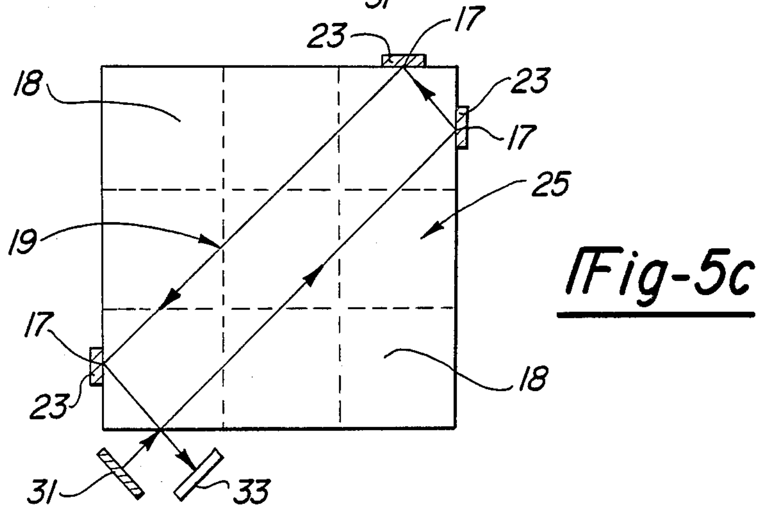
FIG. 5C is a stacked, rectangular, closed loop configuration which yields another "unacceptable" module.

The set of acceptable closed loop configurations are generated by stacking minims to yield modules defined by a choice of integer values for indices "i" and "j". FIG. 5B which is designated as M(2,4), and FIG. 5C which is designated as M(3,3) are examples of unacceptable configurations. Both examples illustrate closed loop, multiply folded optical paths in a rectangular and a square module, respectively. Some possible optical paths tends to concentrate in certain regions of the module, resulting in non-uniform coverage of the module area. As used herein, the term "acceptable" refers only to those modules obtained by a stacking that results in an optical grid with uniform coverage of the area of the module.

It has been found that any number of minims can be stacked to generate modules with "acceptable" multiply folded optical paths; provided that the resulting stack is a module having indices that do not share an integer or half integer greater than one as a common denominator.

Since 2 and 4 are each divisible by an integer other than 1 (the number being 2), that configuration which is shown in FIG. 5A is unacceptable. Similarly, since 3 and 3 are each divisible by an integer other than 1 (the number being 3) the resulting pattern which is shown in FIG. 5B is also unacceptable. No square pattern consisting of the same number of minims in the "i" and "j" directions will yield an acceptable pattern.

The fundamental Rectangular Generator Matrix, shown below as Table I, depicts acceptable (X) and unacceptable (O) rectangular geometries. The matrix is symmetrical, in that $M_{i,j} = M_{j,i}$. Once a module has been chosen from the Generator Matrix, the indices "i" and "j" have been specified. The parameters of the resulting laser resonator are uniquely defined by the choice of the node spacing "a" and "b", which specifies the distance between reflection points on the mirrors.

TABLE I

RECTANGULAR GENERATOR MATRIX

| i/j | 1 | 1.5 | 2 | 2.5 | 3 | 3.5 | 4 | 4.5 | 5 | 5.5 | 6 | 6.5 | 7 | 7.5 | 8 | 8.5 | 9 | 9.5 |
|---|---|---|---|---|---|---|---|---|---|---|---|---|---|---|---|---|---|---|
| 1.0 | X | X | X | X | X | X | X | X | X | X | X | X | X | X | X | X | X | X |
| 1.5 | X | O | X | X | O | X | X | O | X | X | O | X | X | O | X | X | O | X |
| 2.0 | X | X | O | X | X | X | O | X | X | X | O | X | X | X | O | X | X | X |
| 2.5 | X | X | X | O | X | X | X | X | O | X | X | X | X | O | X | X | X | X |
| 3.0 | X | O | X | X | O | X | X | O | X | X | O | X | X | O | X | X | O | X |
| 3.5 | X | X | X | X | X | O | X | X | X | X | X | X | O | X | X | X | X | X |
| 4.0 | X | X | O | X | X | X | O | X | X | X | O | X | X | X | O | X | X | X |
| 4.5 | X | O | X | X | O | X | X | O | X | X | O | X | X | O | X | X | O | X |
| 5.0 | X | X | X | O | X | X | X | X | O | X | X | X | X | O | X | X | X | X |
| 5.5 | X | X | X | X | X | X | X | X | X | O | X | X | X | X | X | X | X | X |
| 6.0 | X | O | O | X | O | X | O | O | X | X | O | X | X | O | O | X | O | X |
| 6.5 | X | X | X | X | X | X | X | X | X | X | X | O | X | X | X | X | X | X |
| 7.0 | X | X | X | X | X | O | X | X | X | X | X | X | O | X | X | X | X | X |
| 7.5 | X | O | X | O | O | X | X | O | O | X | O | X | X | O | X | X | O | X |
| 8.0 | X | X | O | X | X | X | O | X | X | X | O | X | X | X | O | X | X | X |
| 8.5 | X | X | X | X | X | X | X | X | X | X | X | X | X | X | X | O | X | X |
| 9.0 | X | O | X | X | O | X | X | O | X | X | O | X | X | O | X | X | O | X |
| 9.5 | X | X | X | X | X | X | X | X | X | X | X | X | X | X | X | X | X | O |
| 10.0 | X | X | O | O | X | X | O | X | O | X | O | X | X | O | O | X | X | X |

X = Acceptable
O = Not Acceptable

This Matrix can be readily expanded to determine acceptable stacking patterns for larger geometries, by applying the test of whether or not the indices share an integer or half-integer common denominator greater than 1.

Figure 5D:
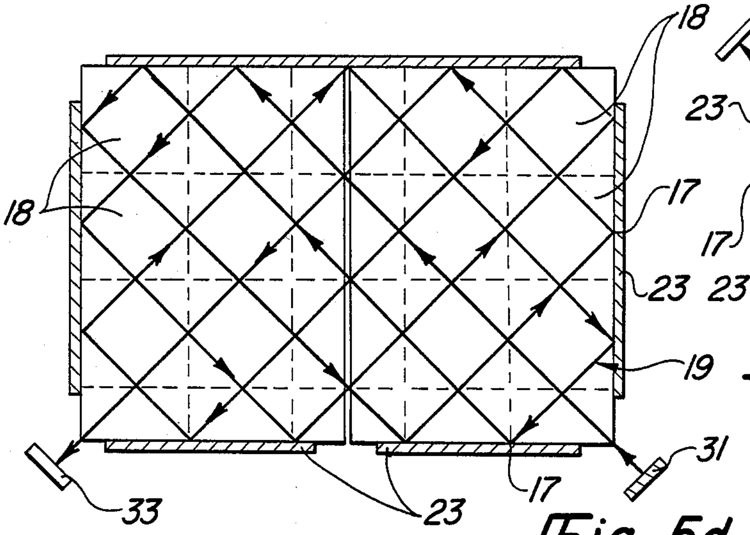
FIG. 5D' is a rectangular open loop module, where the optical path enters the module at one corner and exits the module at the opposite corner.
Figure 5D:
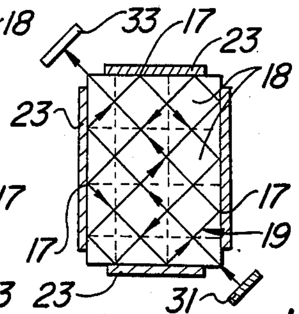

It is also possible to stack either closed or open loop modules to generate larger closed or open loop modules. The rules that govern this type of stacking are the same that govern the stacking of minims, i.e., the module obtained by stacking smaller modules may not have indices that share common denominators larger than 1. FIG. 5D' is a rectangular open loop module where the optical path enters at one corner and exits the module at the opposite corner. FIG. 5D depicts the rectangular, open loop module obtained by stacking the two smaller modules depicted in FIG. 5D'. In this example:

$$M(2.5,3.5)+M(2.5,3.5)=M((2)2.5,3.5)=M(5,3.5)$$

Figure 5E:
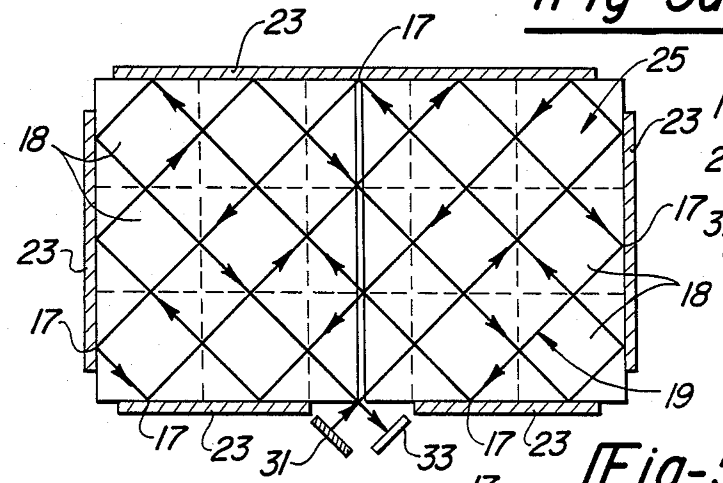
FIG. 5E' is a rectangular open loop module, where the optical path enters the module at one corner and exits the module at an adjacent corner.
Figure 5E:
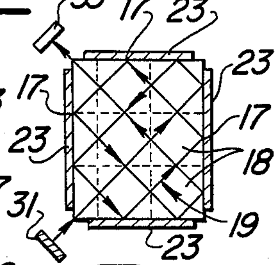
Figure 5F:
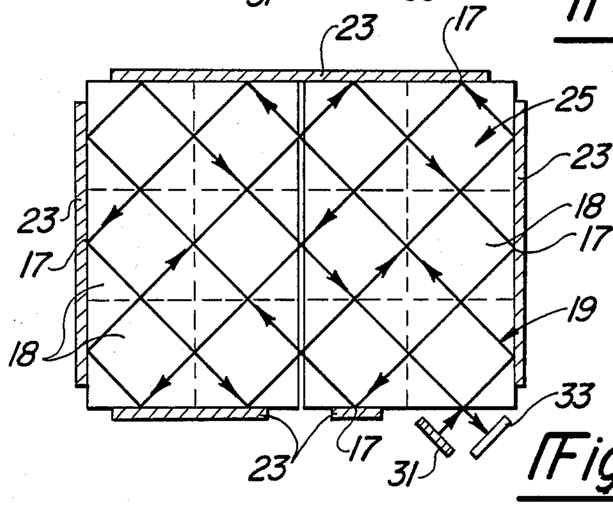
FIG. 5F' is a rectangular closed loop module.
Figure 5F:
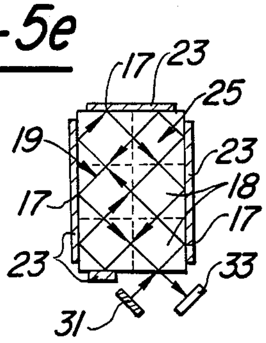

FIG. 5E' is a rectangular open loop module where the optical path enters the module at one corner and exits the module at an adjacent corner. FIG. 5F' is a rectangular closed loop module. FIG. 5E depicts a rectangular, closed loop module obtained by stacking the two smaller modules, depicted in FIG. 5E', and FIG. 5F shows a rectangular, closed loop module obtained by stacking two smaller modules depicted in FIG. 5F'. In the notation used herein:

$$M(2.5,3)+M(2.5,3)=M((2)2.5,3)=M(5,3)$$

and $$M(2,3)+M(2,3)=M((2)2,3)=M(4,3)$$

A particularly useful embodiment of this property is the creation of a larger, multiply folded waveguide device by stacking ceramic blocks of a given size in a modular approach, rather than manufacturing specialized larger ceramic blocks.

The module parameters "a", "b", "i", and "j" can be used to define the following laser parameters in two-dimensional grids:

TABLE II

OPEN LOOP RECTANGULAR GEOMETRIES

| LASER PARAMETER | SYMBOL | EXPRESSION |
|---|---|---|
| Laser Dimensions | X,Y | ia,jb |
| Total Path Length | L | $2ij(a^2 + b^2)^{0.5}$ |
| Number of Node Reflections | $R_N$ | $2(i + j - 1)$ |
| Number of Internal Crossings | $C_N$ | $(2i - 1)(2j - 1)/2$ |

TABLE III

CLOSED LOOP RECTANGULAR GEOMETRIES

| LASER PARAMETER | SYMBOL | EXPRESSION |
|---|---|---|
| Laser Dimensions | X,Y | ia,jb |
| Total Path Length | L | $2ij(a^2 + b^2)0.5$ |
| Number of Node Reflections | $R_N$ | $2(i + j)$ |
| Number of Internal Crossings | $C_N$ | $i(j - 1) + j(i - 1)$ |

In closed loop configurations, no provision has been made in these expressions for a cutaway corner.

A resonator can be designed by selecting values for these parameters and by solving the above expressions. For example, a path length (L) of 50 cm may be selected to minimize the total number of nodes. This is important in applications to lasers with a medium or low gain, since each node introduces losses due to less than perfect mirror reflectivity. A closed loop "quasi-square" is selected where i=2, and j=3. If square minims (with a=b) are used, than "a" is calculated to be 2.95 cm for the node spacing, A is calculated to be 52 square cm, X is calculated to be 5.89 cm, and Y is calculated to be 8.84 cm.

Conversely, if the path length in a given surface area is to be maximized for a laser with a medium of high gain, regardless of the number of nodes, a different approach is used. The parameters selected are A=52 square cm (the same as the previous example), i=4, j=5 (again a closed loop, "quasi-square" geometry), and again square minims are used (a=b). Then "a" is calculated to be 1.61 cm for the node spacing, X is calculated to be 6.45 cm, and Y is calculated to be 8.06 cm, producing a path length (L) of 91 cm.

Figure 6:
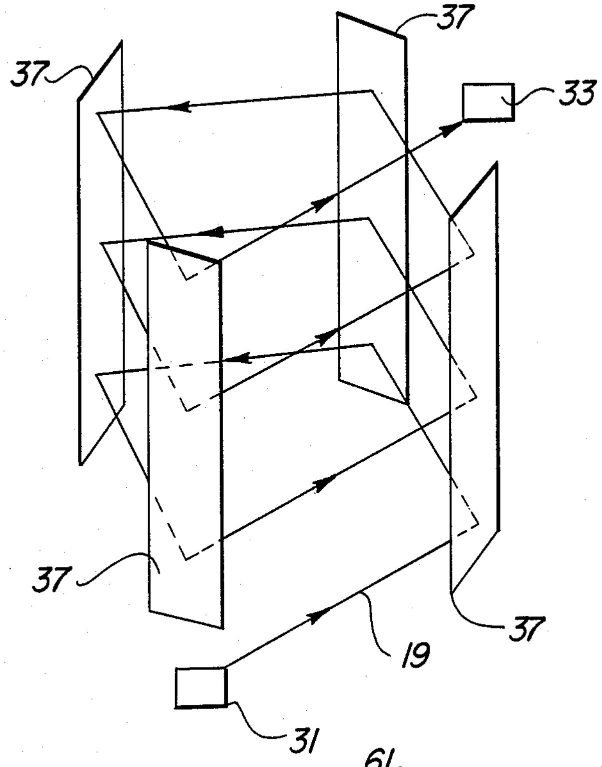
FIG. 6 is a three-dimensional, rectangular, open loop pattern.

FIG. 6 is a simplified depiction of how the principles of this invention can be applied to non-planar configurations. A simplified open loop geometry is shown, having four fold mirrors 37, although three mirror would work equally well. Total reflector 31 and output coupler 33 are arranged relative to the optical path 19 and mirrors 37, so as to progressively change the elevation of the path with each successive reflection within the laser cavity.

Figure 7:
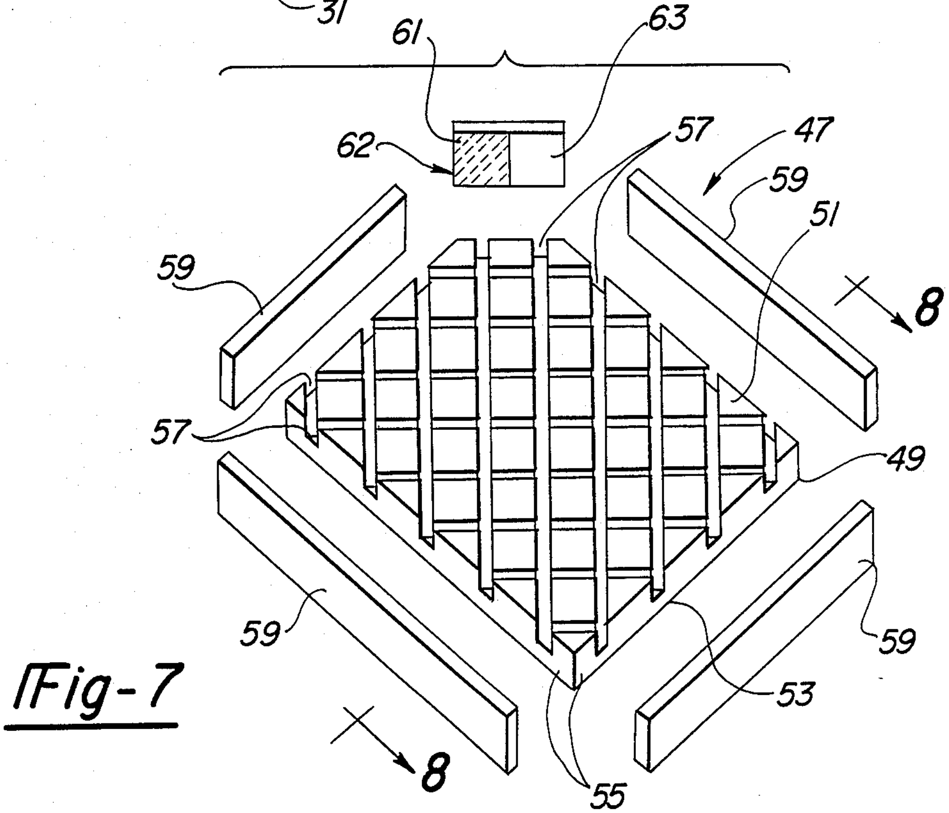
FIG. 7 is a segmented perspective view of a rectangular, two-dimensional laser resonator.
Figure 8:
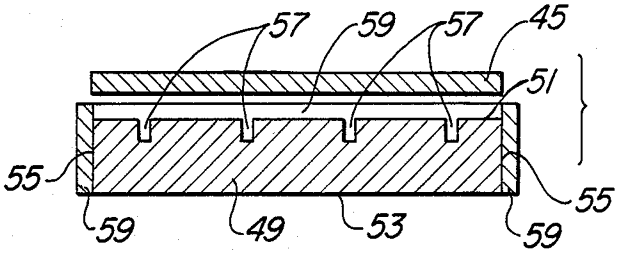
FIG. 8 is a cutaway elevation of the laser resonator structure taken along line 8—8 in FIG. 7.

FIG. 7 and FIG. 8 depict the preferred embodiment of laser resonator 47 within a waveguide gas laser system, which includes polygonal ceramic block 49, intersecting waveguides 57 formed in block 49, reflecting mirrors 59, with total reflecting mirror 63, output coupler 61 "split coated" on single optical substrate 62.

A gaseous laser gain medium is contained in the waveguides. Any gas mixture capable of laser action is suitable for use as a gain medium in this multiply folded waveguide gas laser structure. Although a waveguide $CO_2$ laser is preferred as the gain medium, liquid and solid gain mediums may be utilized. Various types of dye lasers and laser diodes are examples of liquid and solid gain mediums, respectively. The waveguide $CO_2$ laser, using a mixture Xe, $CO_2$, $N_2$, and He in typical proportions of 1-10-20-65% is preferred.

When a rectangular module is used, opposing vertical outer surfaces 55 of the ceramic block 49 are parallel. Reflecting mirrors 59 are mounted adjacent to and parallel to vertical outer surfaces 55 of block 49. The incident angle on the second fold mirror preferably is complementary to the incident angle on the first fold mirrors, to produce a regular and evenly spaced optical path. In the case of modules obtained by stacking square minims, waveguides 57 are located at 45° angles with respect to the normal to the surface of reflective mirrors 59, with light reflected at a 90° angle upon each incidence with a reflecting mirror.

Higher power output can be generated by serially connecting more than one laser resonator 47, while using only one output coupler 61 and one mirror 63, or by using one laser resonator 47 serially connected to one or more amplifier stages. Such stages may be standard amplifiers, or may make use of the multiply folded design of this invention. Use of the present design for amplification requires the substitution of anti-reflection coated windows in place of output coupler 61 and mirror 63.

Ceramic block 49 is composed of a solid ceramic material, such as aluminum oxide or beryllium oxide. Block 49 has first horizontal surface 51 substantially parallel to second horizontal surface 53, and four vertical outer surfaces 55. Block 49 contains a series of intersecting waveguides 57. The waveguides may be cut into first horizontal surface 51 of the block, or may be drilled in the block (not shown). Rather than the flat waveguide grooves 57 depicted in FIG. 7 and FIG. 8, waveguides with circular cross-sections may be used which are drilled into block 49. Waveguides having circular cross-sections make alignment easier and result in a more stable laser resonator mode structure. However, circular grooves are more difficult to machine, since the grooves are drilled at acute angles relative to outer surfaces 55. When waveguides with square or rectangular cross-sections are used, a flat ceramic cover plate 45 may be used to provide all-ceramic boundaries to the waveguide channels.

Lasers with longer optical path lengths (and therefore more power) can be obtained not only by machining larger blocks, but also by stacking smaller blocks, as indicated above. At the points where the waveguides intersect, negligible intracavity diffraction losses are introduced. Waveguide cross-section dimensions are preferably in the range of 50 to 250 times the wavelength or radiation to be propagated in the waveguide, and the distance between intersections is at least 2.5 times the waveguide cross-section.

Figure 9:
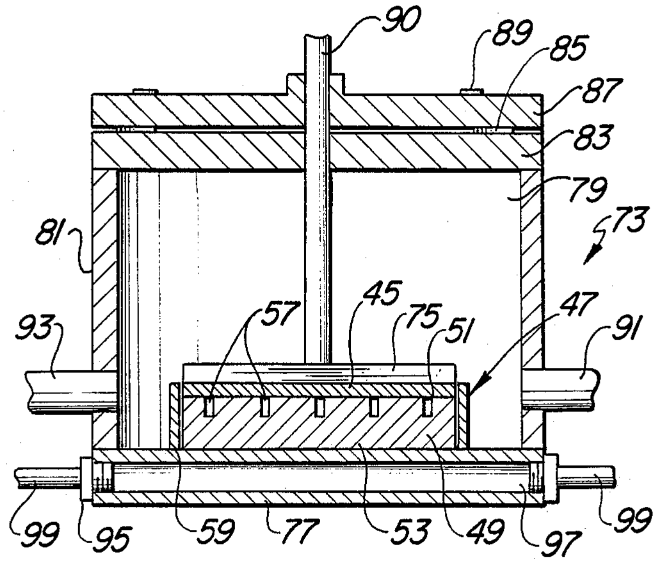
FIG. 9 is a cutaway elevation of the sealed laser head.

Reflecting mirrors 59 and substrate 62 are adjacent to vertical outer surfaces 55. Reflecting mirrors 59 and substrate 62 may be integrally attached to block 49, as shown in FIG. 8. Alternatively, the reflecting mirrors may be permanently mounted a small distance from the block, leaving a small gap (0.2 to 5.0 mm) for gas flow (as shown in FIG. 9). A spacer may be inserted between block 49 and substrate 62 to ensure a uniform distance between these elements.

In general, reflecting mirrors 59 are substantially parallel to vertical outer surfaces 55. However, other means of reflection, such as diffraction gratings or prisms, may be used. Generally, the gratings or prisms may not be parallel to the vertical outer surfaces, thereby increasing the size of the laser resonator 47. However, the use of the gratings or prisms allows the laser output radiation to be tuned.

The purpose of the folding mirrors is to connect optically adjacent waveguide channels with minimum losses. Standard statement-of-the-art reflectors at 10.6 microns ($CO_2$) wavelength include silicon substrates with enhanced and protected silver or gold coatings, with measured reflectivity (with a 45 degree angle of incidence) of 99.8% for s-polarization (parallel to the plane of incidence to the mirror) and of 99.5% for p-polarization (perpendicular to the plane of incidence to the mirror). In the absence of any other polarization determining elements, this difference dictates laser operations in a fixed s-polarization with waveguide modules of ten nodes or more. Fixed polarization lasers are generally preferred to lasers with a random or varying plane of polarization. A typical folding mirror is 5 to 10 cm long, 6 mm high, and 6 mm thick.

The multiple reflections increase the difficulty of aligning the laser resonator. Although individual mirrors mounted at each node in a series of planes may be used (not shown), this multiplicity of mirrors causes alignment difficulties and generally results in increased costs. The alignment problems are minimized by the use of a minimum number of reflecting mirrors 59, by having mirrors 59 and substrate 62 permanently mounted adjacent, or integrally attached, to block 49, and by locating more than one node on each mirror 59. Thus, the distance between waveguides 57 and these optics is minimized. This resonator design has several advantages. First, the optical path outside the waveguide channels is negligible, reducing diffraction losses. Second, the total non-gain path is minimized. Third, permanently mounting reflecting mirrors 59 and substrate 62 enhances the stability, ruggedness, and portability of the resonator.

Output coupler 61 is typically obtained from a zinc selenide substrate, although other materials can also be used. The substrate is antireflection coated on the surface away from the ceramic waveguide, and coated for the appropriate reflectivity on the surface facing the ceramic waveguide. The reflectivity value depends upon the resonator length, resonator losses, and fill pressure, but is typically in the range of 75% to 95%. Typically, output coupler 61 and mirror 63 are about the same size: about 6 to 9 mm in diameter, and 3 mm thick. Mirror 63, output coupler 61 and folding mirror 59 are commercially available from Laser Optics, Inc.

Figure 10:
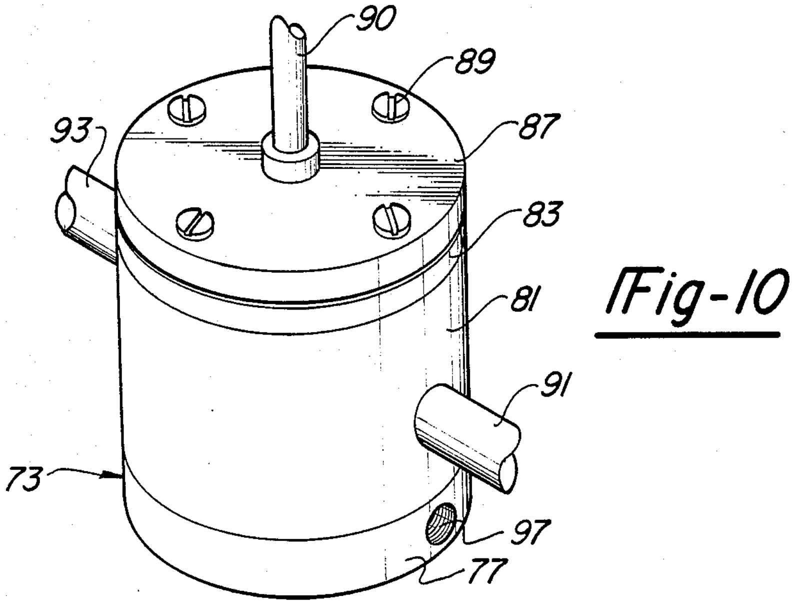
FIG. 10 is a perspective view of the sealed laser head shown in FIG. 9.

FIG. 9 and FIG. 10 depict a cutaway view and a perspective view respectively of sealed laser head 73. Laser resonator 47, including reflecting mirrors 59 and ceramic block 49, is situated between first electrode 75 and second electrode 77. The electrodes shown in FIG. 9 are external electrodes, situated above and below first horizontal surface 51 and second horizontal surface 53 of block 49. Alternatively, the electrodes may be hybrid, with one electrode providing a metal boundary to the waveguide channels and one electrode below second horizontal surface 53 of block 49, or both electrodes may be used to provide top and bottom metal boundaries to the waveguide channels. The external electrode configuration is preferred, since it removes metal electrodes from the active discharge region, thereby improving the life of the laser. A discharge between the electrodes excites the gas medium, creating population inversion. The electrodes preferably receive power from a radio frequency generator, although other discharge sources may be used. Laser resonator 47 and first electrode 75 are contained within sealed volume 79 defined by second electrode 77, walls 81, and flange 83. Only laser resonator 47 need be within the sealed volume. The gas mixture is contained in sealed volume 79 and can flow into and out of waveguides 57 through gaps between reflecting mirrors 59 and ceramic block 49 (as shown in FIG. 9). Also, the gas mixture can be fully sealed within laser resonator 47, without the use of a larger sealed volume.

Insulated RF power feedthrough 90 is connected to first electrode 75. Sealed volume 79 is closed by flange 83, gasket 85, and sealing cap 87 which may be tightened against flange 83 with sealing bolts 89. Sealing bolts 89 permit access to laser resonator 47 for replacement or adjustment.

Walls 81, electrodes 75 and 77, flange 83, and sealing cap 87 are preferably made of stainless steel. Gasket 85 is made of malleable material, such as copper. FIG. 10 shows a cylindrical laser head 73, which uses stainless steel tubing for walls 81. Second electrode 77 seals volume 79 at one end, and flange 83, gasket 85, and sealing cap 87 close volume 79 at the opposite end of the cylinder.

Optical output port 91 and gas fill port 93 are attached to walls 81. Optical output port 91 contains an anti-reflection coated window and is located with respect to output coupler 63 so as to allow power extraction from the laser resonator. Alternatively, block 49 may be mounted within sealed laser head 73 so that output coupler 63 is situated in optical output port 91. Gas fill port 93 may be of the pinch off type, or may be of a stopcock type for repetitive use where frequent exchanges of the gaseous laser gain medium are necessary.

Power transferred from the RF discharge of the electrodes to ceramic block 49 causes heating of the block. This heat can cause instability and lower power output of the laser. The use of ceramic material with a high heat transfer capability, such as BeO, enhances the ability to dissipate heat from block 49.

The ceramic block 49 fulfills the dual role of insulating spacer between top RF electrode 75 and bottom RF groundplane 77, and of cooling interface between the hot laser plasma and the bottom cooling place. Beryllia is the preferred ceramic because of its high thermal conductivity, even though it is toxic in powder form. Beryllia is readily available and can be easily fabricated into waveguide grids. High purity alumina (98.5% or higher) may be used in lower power applications at reduced thermal loads.

A prototype laser resonator has been built using a 98.5% beryllia ceramic block with intersecting waveguides, and machined into a M(3.5,4) open loop structure. The structure has 13 nodes (R), 21 crossings (C), "a" and "b" are each equal to 0.75 inches (square minims), and the path length (L) is 29.7 inches. Three of the fold mirrors are 1.75 inches long, 0.25 inches high, and 0.25 inches thick. The fourth mirror is 2.75 inches long, with the same height and thickness. All four mirrors are precisely located around the perimeter of the block at a spacing 0.010 inches form the vertical outer surfaces of the block. Mirror reflectivity is measured at 99.7% per reflection for s-polarization. A beryllia plate is used as a top cover. The ceramic block and the fold mirror assembly rest on an aluminum plate serving as a ground electrode and cooling plate, and carrying a serpentine cooling water channel. The laser cavity is filled with a mixture of $CO_2$, $N_2$. and He (1:1:3.8) with 5% added Xe. At a fill pressure of 70 Torr, with output coupler reflectivity of 80% and RF power input of 300 watts, a continuous power output of 22 watts is achieved.

Although only geometries involving three and four reflecting mirrors have been discussed herein, it is clear that the principles of this invention can be applied by one skilled in the art to more sophisticated structures, such as non-planar configurations or geometries with more than four mirrors. Similarly, although much of the disclosure has involved waveguide lasers, the principles of this invention are applicable to non-waveguide laser systems, such as free space mode lasers.

Accordingly, there has been provided stacking configurations and methods for generating multiply folded optical paths, in accordance with the invention that satisfies all of the objectives set forth above. It is understood that all terms used herein are descriptive rather than limiting. While the invention has been described in conjunction with specific embodiments, it is evident that many alternatives, modifications and variations will be apparent to those skilled in the art in light of the disclosure herein. Accordingly, it is intended to include all such alternatives, modifications, variations that fall within the spirit and scope of the appended claims.

We claim:

1. A laser resonator, which comprises:

an active medium within the resonator capable of supporting laser action;

a plurality of solid blocks disposed within the laser resonator, each block having a smaller, multiply folded waveguide channel formed therein; and a multiplicity of mirrors disposed within the resonator, the mirrors being located around the perimeter of the solid blocks, the mirrors being arranged to produce a larger, multiply folded optical path along the waveguide channels.

2. The laser resonator of claim 1, wherein the active medium is a gas, a solid, or a liquid.

3. The laser resonator of claim 1, wherein the waveguide channels are evenly spaced across the blocks.

4. The laser resonator of claim 1, wherein the waveguide channels intersect each other.

5. The laser resonator of claim 1, wherein the waveguide channels are substantially located within the same plane.

6. The laser resonator of claim 1, wherein the mirrors are coated to front reflect optical radiation.

7. A process for forming a laser resonator with a multiply folded optical path, which comprises:

providing an active medium within the resonator capable of supporting laser action;

providing a plurality of solid blocks, each of the blocks having more than one smaller, multiply folded waveguide channel formed therein;

arranging multiplicity of mirrors around the perimeter of the resonator; and stacking the blocks together such that the mirrors are located around the stacked blocks, and aligning the waveguide channels to form a larger, multiply folded optical path.

8. The process of claim 7, wherein the waveguide channels are evenly spaced across the solid blocks.

9. The process of claim 7, wherein the waveguide channels intersect each other.

10. The process of claim 7, wherein the waveguide channels are substantially located within the same plane.

11. The process of claim 7, wherein the mirrors are coated to front reflect optical radiation.

12. A laser resonator, which comprises:

an active medium within the laser resonator capable of supporting laser action;

a plurality of minims disposed within the laser resonator, the minims being stacked and aligned with respect to each other; and a multiplicity of mirrors located around the perimeter of the minims within the laser resonator, each of the mirrors being coated to front reflect optical radiation, the mirrors being aligned with respect to each other and with respect to the minims to produce a multiply folded optical path within the minims.

13. The laser resonator of claim 12, wherein the active medium is a solid, a liquid, or a gas.

14. The laser resonator of claim 12, wherein the minims each have a substantially rectangular shape.

15. The laser resonator of claim 14, wherein the length of the folded optical path (L) is essentially equal to:

$$L=2ij(a^2+b^2)^{\frac{1}{2}}$$

where the rectangular minim has an "a" dimension along an axis, and a "b" dimension along another axis, "i" is the number of minims along the a-axis; and "j" is the number of minims along the b-axis.

16. The laser resonator of claim 12, wherein the minims each have a substantially triangular shape.

17. A process for forming a multiply folded optical path within a laser resonator, which comprises:

providing an active medium capable of supporting laser action within the resonator;

positioning a multiplicity of mirrors around the perimeter of the minims, each mirror being coated to front reflect optical radiation; and stacking and aligning a plurality of minims together to form a multiply folded optical path within the minims.

18. The laser resonator of claim 17, wherein the minims each have a substantially rectangular shape.

19. The laser resonator of claim 18, wherein the length of the folded optical path (L) is essentially equal to:

$$L=2ij(a^2+b^2)^{\frac{1}{2}}$$

where the rectangular minim has an "a" dimension along an axis, and a "b" dimension along another axis, "i" is the number of minims along the a-axis; and "j" is the number of minims along the b-axis.

20. The laser resonator of claim 17, wherein the minims each have a substantially triangular shape.

* * * * *